United States Patent
Seo et al.

(10) Patent No.: US 10,749,707 B2
(45) Date of Patent: Aug. 18, 2020

(54) METHOD AND APPARATUS FOR REPRODUCING CONTENTS BASED ON PRESENTATION TIME IN AUTOMOTIVE NETWORK

(71) Applicants: HYUNDAI MOTOR COMPANY, Seoul (KR); KIA MOTORS CORPORATION, Seoul (KR)

(72) Inventors: Kang Woon Seo, Seoul (KR); Dong Ok Kim, Goyang-si (KR); Jin Hwa Yun, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/821,623

(22) Filed: Nov. 22, 2017

(65) Prior Publication Data

US 2018/0145848 A1    May 24, 2018

(30) Foreign Application Priority Data

Nov. 22, 2016 (KR) .................. 10-2016-0156078
Oct. 19, 2017 (KR) .................. 10-2017-0135641

(51) Int. Cl.

| | | |
|---|---|---|
| *H04L 12/40* | (2006.01) | |
| *H04L 29/08* | (2006.01) | |
| *H04L 29/06* | (2006.01) | |
| *H04L 12/26* | (2006.01) | |
| *H04N 21/8547* | (2011.01) | |
| *H04N 21/63* | (2011.01) | |
| *H04N 21/414* | (2011.01) | |
| *H04N 21/434* | (2011.01) | |
| *H04J 3/06* | (2006.01) | |

(52) U.S. Cl.
CPC .......... *H04L 12/4013* (2013.01); *H04J 3/067* (2013.01); *H04L 43/106* (2013.01); *H04L 67/12* (2013.01); *H04L 69/22* (2013.01); *H04L 69/323* (2013.01); *H04N 21/41422* (2013.01); *H04N 21/434* (2013.01); *H04N 21/632* (2013.01); *H04N 21/8547* (2013.01); *H04L 2012/40215* (2013.01); *H04L 2012/40273* (2013.01)

(58) Field of Classification Search
CPC ......... H04L 12/40; H04L 29/18; H04L 12/26; H04L 29/06; H04L 12/40071
USPC ....................................... 370/351
See application file for complete search history.

(56) References Cited

U.S. PATENT DOCUMENTS

| | | | | |
|---|---|---|---|---|
| 5,380,993 A | * | 1/1995 | Komai | G06K 7/14 235/462.01 |
| 5,815,690 A | * | 9/1998 | Kowert | H04J 3/062 702/190 |

(Continued)

*Primary Examiner* — Jeffrey M Rutkowski
*Assistant Examiner* — Sudesh M Patidar
(74) *Attorney, Agent, or Firm* — Mintz Levin Cohn Ferris Glovsky and Popeo, P.C.; Peter F. Corless

(57) ABSTRACT

A method for operating a first communication node connected to an in-vehicle network is provided. The method comprises generating a header including a count field indicating a wraparound count for a presentation time of contents and a timestamp field indicating the presentation time, generating a payload field including the contents, and transmitting a frame including the header and the payload field to a second communication node connected to the in-vehicle network.

17 Claims, 8 Drawing Sheets

(56) References Cited

U.S. PATENT DOCUMENTS

| | | | |
|---|---|---|---|
| 2003/0103604 A1* | 6/2003 | Kato | G11B 27/034 379/68 |
| 2005/0058090 A1* | 3/2005 | Chang | H04L 12/66 370/312 |
| 2008/0004782 A1* | 1/2008 | Kobayashi | G06F 9/4887 701/66 |
| 2012/0113270 A1* | 5/2012 | Spracklen | H04N 17/004 348/194 |
| 2015/0245306 A1* | 8/2015 | Boehlke | H04J 3/0664 370/350 |
| 2016/0182176 A1* | 6/2016 | Ramachandra | H04J 3/0661 370/429 |
| 2018/0247676 A1* | 8/2018 | Raphael | G11B 31/006 |

* cited by examiner

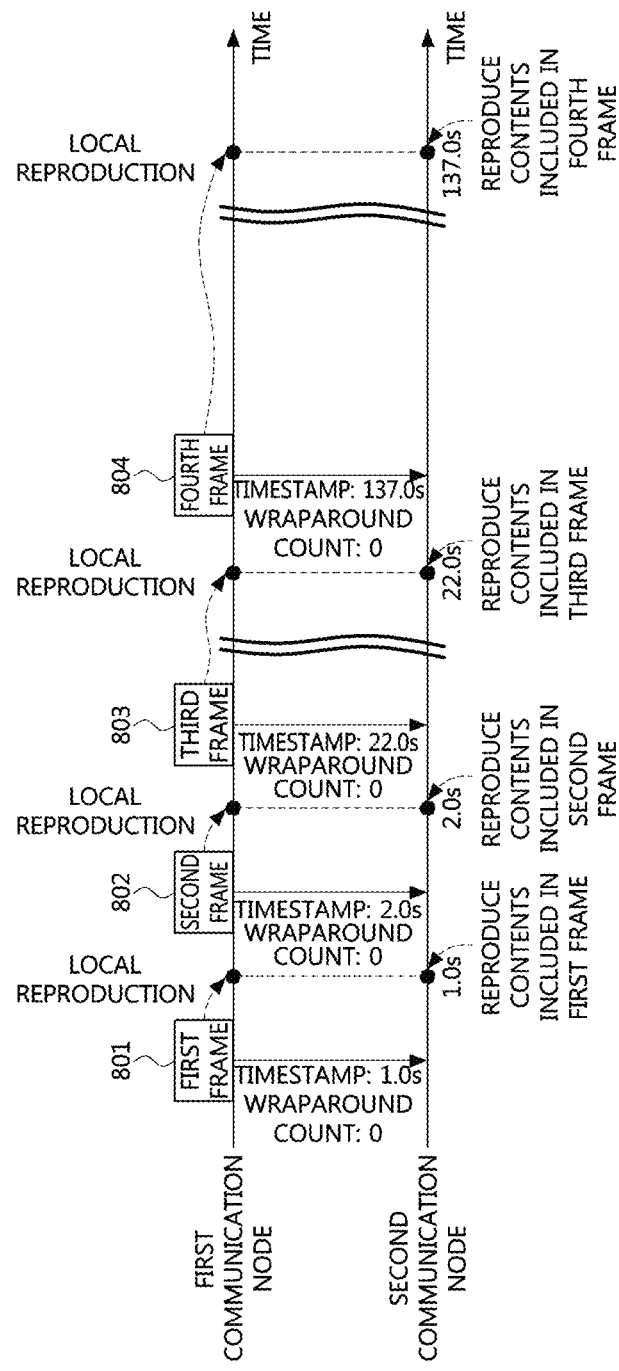

METHOD AND APPARATUS FOR REPRODUCING CONTENTS BASED ON PRESENTATION TIME IN AUTOMOTIVE NETWORK

CROSS-REFERENCE TO RELATED APPLICATIONS

This application is based on and claims the benefit of priority to Korean Patent Applications No. 10-2016-0156078 filed on Nov. 22, 2016 and No. 10-2017-0135641 filed on Oct. 19, 2017 in the Korean Intellectual Property Office (KIPO), the entirety of which is incorporated by reference as if fully set forth herein.

TECHNICAL FIELD

The present disclosure relates to a communication technology in a vehicle network, and more specifically, to techniques for reproducing contents (e.g., audio, video, etc.) based on a presentation time in a vehicle network.

BACKGROUND

Electronic devices installed in a vehicle have been increased significantly in their number and variety along with recent digitalization of vehicle parts. Generally, the electronic devices may be used throughout the vehicle, for example, a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices used in each of these systems are connected via the vehicle network, which supports functions of the electronic devices. For instance, the CAN may support a transmission rate of up to 1 Mbps and support automatic retransmission of colliding messages, error detection based on a cycle redundancy interface (CRC), or the like. The FlexRay-based network may support a transmission rate of up to 10 Mbps and support simultaneous transmission of data through two channels, synchronous data transmission, or the like. The MOST-based network is a communication network for high-quality multimedia, which may support a transmission rate of up to 150 Mbps.

The telematics system and the infotainment system, as most enhanced safety systems of a vehicle do, require higher transmission rates and system expandability. However, the CAN, FlexRay-based network, and the like may not sufficiently support such requirements. The MOST-based network, in particular, may support a higher transmission rate than the CAN or the FlexRay-based network. However, applying the MOST-based network to vehicle networks can be costly. Due to these limitations, an Ethernet-based network is often utilized as a vehicle network. The Ethernet-based network may support bi-directional communication through one pair of windings and may support a transmission rate of up to 10 Gbps.

The disclosure of this section is to provide background of the invention. Applicant notes that this section may contain information available before this application. However, by providing this section, Applicant does not admit that any information contained in this section constitutes prior art.

SUMMARY

The present disclosure provides a method and an apparatus of reproducing content for preventing a presentation time error in a vehicle network.

An Ethernet-based network may support a protocol (e.g., audio video bridging (AVB) protocol) defined by the Institute of Electrical and Electronics Engineers (IEEE) 1722 standard. In this case, a transmitting communication node may generate a frame including contents (e.g., audio, video, etc.), a timestamp field indicating a presentation time of the contents, and the like, and transmit the frame. Also, a receiving communication node may receive the frame from the transmitting communication node and may reproduce the contents included in the frame at the presentation time indicated by the timestamp field included in the frame.

However, since a unit of the presentation time indicated by the timestamp field is fixed as nanosecond (ns), the time that can be represented by the timestamp field may be limited. Also, since the size of the timestamp field included in the frame is 32 bits, the maximum value of the presentation time indicated by the timestamp field is 4.3 seconds, and a playback time of the content is calculated in a wraparound manner. In this case, due to a difference between a wraparound count at the transmitting communication node and a wraparound count at the receiving communication node, the playback time of the contents calculated by the receiving communication node may be different from the playback time intended by the transmitting communication node. Therefore, the contents contained in the frame may be reproduced at an improper time.

In accordance with embodiments of the present disclosure, an operation method of a first communication node in a vehicle network may comprise generating a header including a count field indicating a wraparound count for a presentation time of contents and a timestamp field indicating the presentation time; generating a payload field including the contents; and transmitting a frame including the header and the payload field to a second communication node belonging to the vehicle network.

The header may further include a unit field indicating a unit of the presentation time, and the unit field may be set to indicate nanosecond, microsecond, millisecond, or second.

The timestamp field may indicate a specific time from 0 to 4.3 seconds when the unit field indicates nanosecond, the timestamp field may indicate a specific time from 0 to 4300 seconds when the unit field indicates microsecond, the timestamp field may indicate a specific time from 0 to 4300000 seconds when the unit field indicates millisecond, and the timestamp field may indicate a specific time from 0 to 4300000000 seconds when the unit field indicates second.

The frame may be generated based on an Institute of Electrical and Electronics Engineers (IEEE) 1722 protocol, 2 bits of a reserved field included in the header of the frame may be used for the unit field, and the remaining bits of the reserved field, except for the 2 bits used for the unit field, may be used for the count field.

The contents may be reproduced at $T_A$ obtained by $T_A = (T_{max} \times C) + T_P$, wherein $T_{max}$ is a maximum value that can be set in the timestamp field, $C$ is the wraparound count indicated by the count field, and $T_P$ is the presentation time indicated by the timestamp field.

The vehicle network comprises a plurality of end nodes, a plurality of switches, and at least one gateway, wherein the first communication node is a first end node among the plurality of end nodes, and the second communication node is a second end node among the plurality of end nodes.

Further, in accordance with embodiments of the present disclosure, an operation method of a first communication node in a vehicle network may comprise receiving a frame including a header and a payload field from a second communication node belonging to the vehicle network; identifying a unit of a presentation time of contents included in the payload field based on a unit field included in the header; identifying a wraparound count for the presentation time of contents based on a count field included in the header; identifying the presentation time based on a timestamp field included in the header; and reproducing the contents at a time indicated by the unit of the presentation time, the wraparound count, and the presentation time.

The unit field may be set to indicate nanosecond, microsecond, millisecond, or second.

The timestamp field may indicate a specific time from 0 to 4.3 seconds when the unit field indicates nanosecond, the timestamp field may indicate a specific time from 0 to 4300 seconds when the unit field indicates microsecond, the timestamp field may indicate a specific time from 0 to 4300000 seconds when the unit field indicates millisecond, and the timestamp field may indicate a specific time from 0 to 4300000000 seconds when the unit field indicates second.

The frame may be generated based on an Institute of Electrical and Electronics Engineers (IEEE) 1722 protocol, 2 bits of a reserved field included in the header of the frame may be used for the unit field, and the remaining bits of the reserved field, except for the 2 bits used for the unit field, may be used for the count field.

The contents may be reproduced at $T_A$ obtained by $T_A = (T_{max} \times C) + T_P$, wherein $T_{max}$ is a maximum value that can be set in the timestamp field, C is the wraparound count indicated by the count field, and $T_P$ is the presentation time indicated by the timestamp field.

Further, in accordance with embodiments of the present disclosure, a first communication node in a vehicle network may comprise a processor and a memory storing at least one instruction executed by the processor. Also, the at least one instruction may be configured to generate a header including a count field indicating a wraparound count for a presentation time of contents and a timestamp field indicating the presentation time; generate a payload field including the contents; and transmit a frame including the header and the payload field to a second communication node belonging to the vehicle network.

The header further may include a unit field indicating a unit of the presentation time, and the unit field may be set to indicate nanosecond, microsecond, millisecond, or second.

The timestamp field may indicate a specific time from 0 to 4.3 seconds when the unit field indicates nanosecond, the timestamp field may indicate a specific time from 0 to 4300 seconds when the unit field indicates microsecond, the timestamp field may indicate a specific time from 0 to 4300000 seconds when the unit field indicates millisecond, and the timestamp field may indicate a specific time from 0 to 4300000000 seconds when the unit field indicates second.

The frame may be generated based on an Institute of Electrical and Electronics Engineers (IEEE) 1722 protocol, 2 bits of a reserved field included in the header of the frame may be used for the unit field, and the remaining bits of the reserved field, except for the 2 bits used for the unit field, may be used for the count field.

The contents may be reproduced at $T_A$ obtained by $T_A = (T_{max} \times C) + T_P$, wherein $T_{max}$ is a maximum value that can be set in the timestamp field, C is the wraparound count indicated by the count field, and $T_P$ is the presentation time indicated by the timestamp field.

The vehicle network may comprise a plurality of end nodes, a plurality of switches, and at least one gateway, wherein the first communication node is a first end node among the plurality of end nodes, and the second communication node is a second end node among the plurality of end nodes.

Using embodiments according to the present disclosure, the presentation time unit indicated by the timestamp field included in the frame can be set to second, millisecond, microsecond, or nanosecond so that various times can be represented by the timestamp field. Also, since the frame transmitted by the transmitting communication node may include the count field indicating a wraparound count of the transmitting communication node, the error in calculating a playback time based on the presentation time at the receiving communication node can be eliminated. Thus, the receiving communication node can reproduce the contents (e.g., audio, video, etc.) included in the frame at the time indicated by the transmitting communication node. Also, the performance of the vehicle network can be improved.

BRIEF DESCRIPTION OF DRAWINGS

Embodiments of the present disclosure will become more apparent by describing in detail forms of the present disclosure with reference to the accompanying drawings, in which:

FIG. 8 is a timing diagram illustrating a fourth embodiment of a communication method in a vehicle network.

Figure 1:
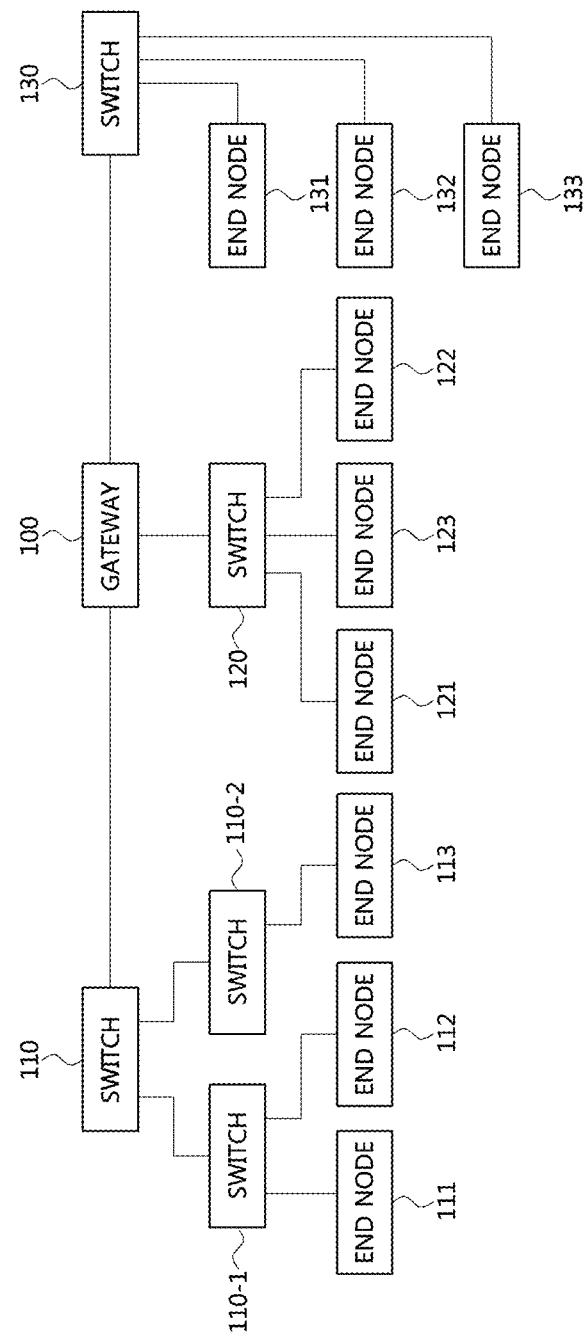
FIG. 1 is a block diagram illustrating a first embodiment of a vehicle network topology.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules. Additionally, it is understood that a controller/control unit may perform one or more of the processes described further below, and the term controller/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

For communication between two nodes (two computing devices) via an in-vehicle network of a vehicle, AVB (audio video bridging) protocol can be used to deliver a content (audio or video) from one node to the other node for presenting the content using an audio/video system of the vehicle. When delivering the content using an ABV protocol, information about timing to present the content (a time delay before presentation of the content) is also delivered using a timestamp field of the ABV protocol. According to a typical AVB protocol, unit of a timestamp field is nanosecond (ns) and the timestamp field may not present a time longer than 4.3 seconds due to a limited data size of the timestamp field.

An aspect of the invention provides a system and method for in-vehicle network communication. Using a proposed ABV protocol, a sending node creates an in-vehicle communication message that includes a field indicating a unit of the timestamp field other than nanosecond. Using a unit other than nanosecond, a wider range of time can be presented in the timestamp field without changing data size of the timestamp field. In embodiments, an in-vehicle communication message further includes a roundup count information such that the receiving node can compute an accurate timing (TA) for presenting a content using the following formula: $TA=(T_{max} \times C)+TP$. $T_{max}$ is a maximum value that can be set in the timestamp field, C is the wraparound count indicated by the count field, and TP is the presentation time indicated by the timestamp field. FIG. 1 is a block diagram illustrating a first embodiment of a vehicle network topology.

Referring to FIG. 1, a communication node constituting a vehicle network may be a gateway, a switch (or bridge), or an end node. The gateway 100 may be connected with at least one switch 110, 110-1, 110-2, 120, and 130, and may be configured to connect different networks. For example, the gateway 100 may support connections between a switch which supports a controller area network (CAN) (or, FlexRay, media oriented system transport (MOST), or local interconnect network (LIN)) network) and a switch which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and control at least one of the end nodes 111, 112, 113, 121, 122, 123, 131, 132, and 133 connected to the switch.

Each of the end nodes 111, 112, 113, 121, 122, 123, 131, 132, and 133 may include an electronic control unit (ECU) configured to control various types of devices mounted within a vehicle. For example, each of the end nodes 111, 112, 113, 121, 122, 123, 131, 132, and 133 may include an ECU included in an infotainment device (e.g., a display device, a navigation device, and an around view monitoring device).

Meanwhile, the communication nodes (i.e., gateways, switches, end nodes, etc.) constituting the vehicle network may be connected in a star topology, a bus topology, a ring topology, a tree topology, a mesh topology, or the like. Further, each of the communication nodes constituting the vehicle network may support the CAN protocol, the FlexRay protocol, the MOST protocol, the LIN protocol, the Ethernet protocol, or the like. A communication node belonging to the vehicle network may be configured as follows.

Figure 2:
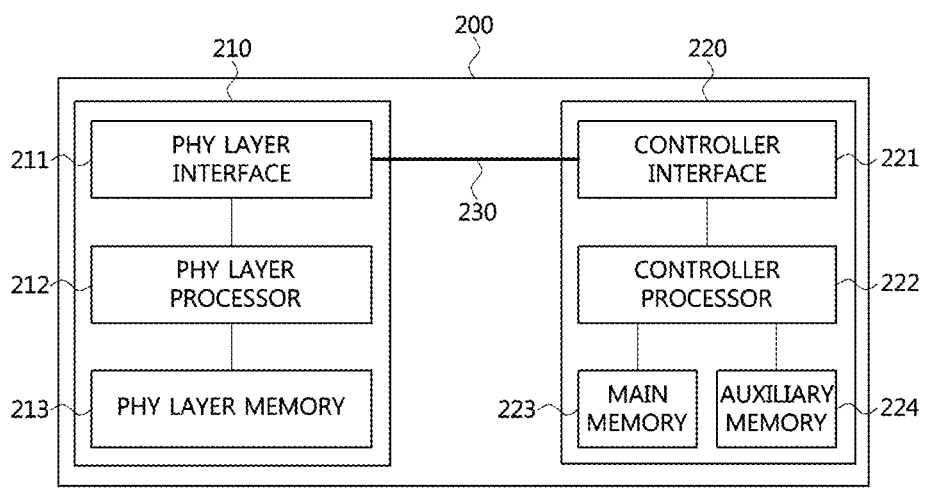
FIG. 2 is a block diagram illustrating a first embodiment of a communication node belonging to a vehicle network.

FIG. 2 is a block diagram illustrating a first embodiment of a communication node belonging to a vehicle network.

Referring to FIG. 2, a communication node 200 constituting a vehicle network illustrated in, e.g., FIG. 1, may include a physical (PHY) layer 210 and a controller 220. Also, the communication node 200 may further include a regulator (not shown) for supplying power. In particular, the controller 220 may be implemented to include a medium access control (MAC) layer. The PHY layer 210 may be configured to receive or transmit signals from or to another communication node. The controller 220 may be configured to control the PHY layer 210 and perform various functions (e.g., an infotainment function, or the like.). The PHY layer 210 and the controller 220 may be implemented as one system on chip (SoC), or alternatively may be implemented as separate chips.

The PHY layer 210 and the controller 220 may be connected via a media independent interface (MII) 230. The MII 230 may include an interface defined in the IEEE 802.3 and may include a data interface and a management interface between the PHY layer 210 and the controller 220. One of a reduced MII (RMII), a gigabit MII (GMII), a reduced GMII (RGMII), a serial GMII (SGMII), a 10 GMII (XGMII) may be used instead of the MII 230. The data interface may include a transmission channel and a reception channel, each of which may have independent clock, data, and control signal. The management interface may include a two-signal interface, one signal for the clock and one signal for the data.

The PHY layer 210 may include a PHY layer interface 211, a PHY layer processor 212, and a PHY layer memory 213. The configuration of the PHY layer 210 is not limited thereto, and the PHY layer 210 may be configured in various ways. The PHY layer interface 211 may be configured to transmit a signal received from the controller 220 to the PHY layer processor 212 and transmit a signal received from the PHY layer processor 212 to the controller 220. The PHY layer processor 212 may be configured to control operations of the PHY layer interface 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller 220 may be configured to monitor and control the PHY layer 210 using the MII 230. The controller 220 may include a controller interface 221, a controller processor 222, a main memory 223, and an auxiliary memory 224. The controller processor 222 is an electric circuitry which performs various functions described below. The configuration of the controller 220 is not limited thereto, and the controller 220 may be configured in various ways. The controller interface 221 may be configured to receive a signal from the PHY layer 210 (e.g., the PHY layer interface 211) or an upper layer (not shown), transmit the received signal to the controller processor 222, and transmit the signal received from the controller processor 222 to the PHY layer 210 or the upper layer. The controller processor 222 may further include independent memory control logic or integrated memory control logic for controlling the controller interface 221, the main memory 223, and the auxiliary memory 224. The memory control logic may be implemented to be included in the main memory 223 and the auxiliary memory 224 or may be implemented to be included in the controller processor 222.

Each of the main memory 223 and the auxiliary memory 224 may be configured to store a signal processed by the controller processor 222 and may be configured to output the stored signal based on a request from the controller processor 222. The main memory 223 may be a volatile memory (e.g., RAM) configured to temporarily store data required for the operation of the controller processor 222. The auxiliary memory 224 may be a non-volatile memory in which an operating system code (e.g., a kernel and a device driver) and an application program code for performing a function of the controller 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

Figure 3:
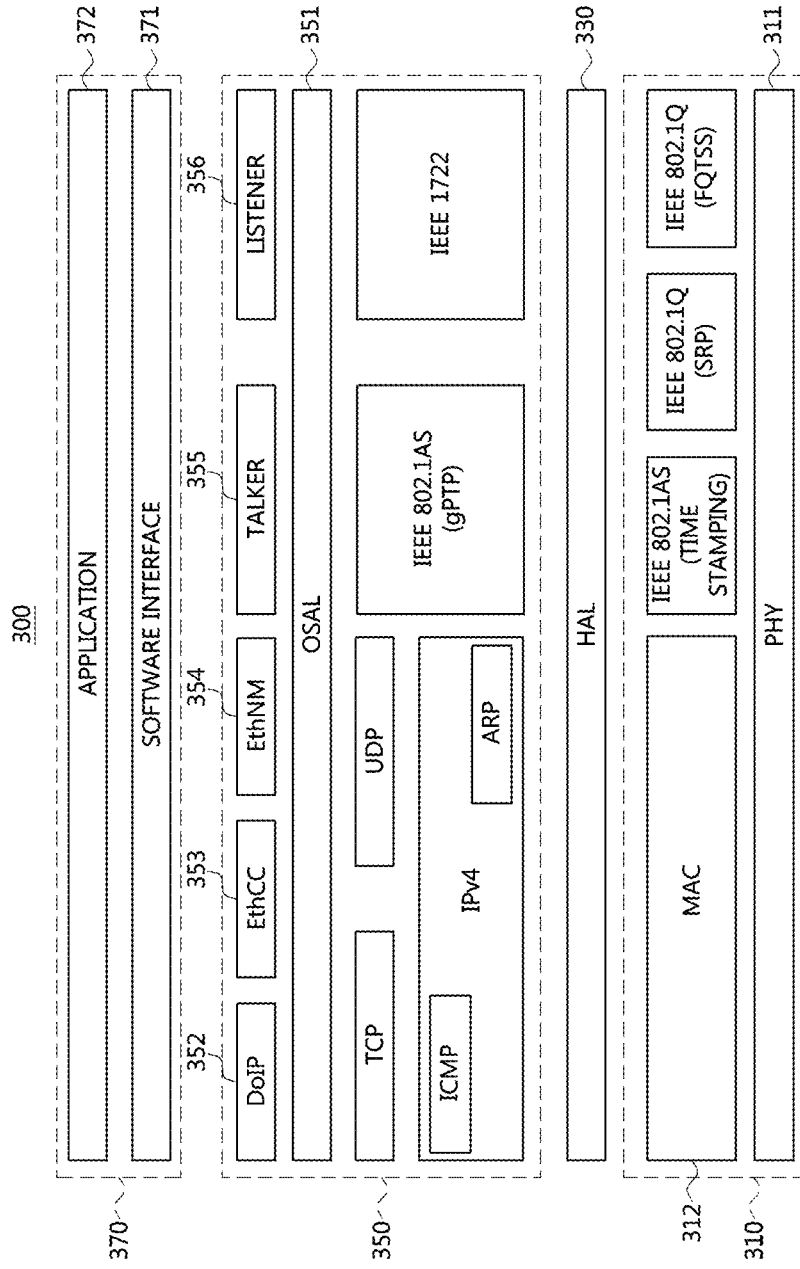
FIG. 3 is a block diagram illustrating a second embodiment of a communication node belonging to a vehicle network.

FIG. 3 is a block diagram illustrating a second embodiment of a communication node belonging to a vehicle network.

Referring to FIG. 3, a communication node 300 constituting a vehicle network may include a hardware layer 310, a hardware abstraction layer (HAL) 330, a middleware layer 350, and an application layer 370. The hardware layer 310 may include a PHY layer 311 and a MAC layer 312. The PHY layer 311 may support the Ethernet protocol and may correspond to the PHY layer 210 described with reference to FIG. 2. The MAC layer 312 may support the Ethernet protocol (e.g., IEEE 802.3, etc.) and may correspond to the controller 220 described with reference to FIG. 2.

The hardware layer 310 may support the audio video bridging (AVB) protocol. For example, the hardware layer 310 may support IEEE 802.1AS timestamping protocol, IEEE 802.1Q stream reservation protocol (SRP), IEEE 802.1Q forwarding & queuing for time-sensitive stream (FQTSS) protocol, etc. The IEEE 802.1AS timestamping protocol may support a stamping operation on a transmission or reception time of a message according to IEEE802.1AS. The IEEE 802.1Q SRP protocol may support reservation operations of stream resources, reservation operations of traffic shaper, and the like. The IEEE 802.1Q FQTSS protocol may support shaping operation on messages to be transmitted, and the like. The hardware layer 310 may support the HAL 330 to enable the middleware layer 350 to operate.

The hardware layer 310 may support three modes. For example, the hardware layer 310 may support a normal mode, a sleep mode, and a power-off mode. In the normal mode, Ethernet communications can be performed. The PHY layer 311 may operate in a normal mode (e.g., an INH pin in an active state) and the MAC layer 312 may operate in an active mode (e.g., a state capable of transmitting and receiving messages). In the sleep mode, Ethernet communications can be performed with limited use of minimal power. When the hardware layer 310 is in the sleep mode, the PHY layer 311 may operate in a sleep mode (e.g., an INH pin in an inactive state) and may be woken up when a remote event is detected. Also, the MAC layer 312 may operate in an inactive mode (e.g., a state in which messages cannot be transmitted or received), and may be woken up when a local event is detected.

In a case that the state of the hardware layer 310 is in the power-off mode, the PHY layer 311 may operate in the sleep mode (e.g., an INH pin in an inactive state), and may be woken up when a remote event is detected. Also, the MAC layer 312 may operate in the inactive mode, and power may not be supplied to the MAC layer 312. That is, the MAC layer 312 cannot be woken up by a local event. The configuration of the hardware layer 310 is not limited to that described above, and the hardware layer 310 may be configured in various ways.

The middleware layer 350 may include an IP middleware layer operating based on a transfer control protocol/internet protocol (TCP/IP), an AVB middleware operating based on the AVB protocol, and an OSAL 351. The IP middleware layer may include a diagnostics over internet protocol (DoIP) unit 352, an EthCC unit 353, an EthNM unit 354, and the like. The DoIP unit 352 may be configured to perform diagnostic communications. The EthCC unit 353 may be configured to transmit and receive control messages. The EthNM unit 354 may be configured to perform network management. The IP middleware layer may support IPv4, internet control message protocol (ICMP), address resolution protocol (ARP), TCP, and UDP. The UDP may process the CRC, the alive counter, etc. for control messages or management messages.

The AVB middleware layer may include a talker unit 355, a listener unit 356, and the like. The talker unit 355 may be configured to perform transmission of an AVB stream based on the AVB protocol. The listener unit 356 may be configured to perform reception of the AVB stream based on the AVB protocol. The AVB middleware layer may support IEEE 802.1AS generalized precision time protocol (gPTP), IEEE 1722 AVB transport protocol (AVTP), etc. The IEEE 802.1AS gPTP may support an operation for selecting a grand master based on a best master clock algorithm (BMCA), an operation for clock synchronization, an operation for calculating a link delay, and the like. The IEEE 1722 AVTP may support operations such as generating an Ethernet message including an audio data unit and a video data unit.

The application layer 370 may include a software interface 371, an application 372, and the like. The software interface 371 may support input and output operations of signals for the application 372. The application 372 may include an application running on TCP/IP, an application running on the AVB protocol, and the like.

Meanwhile, in the communications between the communication nodes shown in FIG. 2 or 3, the first communication node may generate a frame containing contents (e.g., audio, video, etc.), a timestamp field indicating a presentation time of the contents, and the like, and may transmit the generated frame. The second communication node may then receive the frame from the first communication node and may reproduce the contents contained in the frame at the presentation time indicated by the timestamp field contained in the frame. Here, the presentation time may be used for determining a 'playback time (also referred to as a 'reproduction time').

However, since the presentation time indicated by the timestamp field is represented in units of nanoseconds (ns), the time that can be represented by the timestamp field may be limited. Also, the size of the timestamp field included in the frame is 32 bits, the maximum value of the presentation time indicated by the timestamp field is 4.3 seconds, and the presentation time is calculated in a wraparound manner. Meanwhile, due to a latent difference between a wraparound count at the first communication node and a wraparound count at the second communication node, the playback time of the contents calculated based on the presentation time and the wraparound count at the second communication node may be different from the playback time of the contents intended by the first communication node. Therefore, the contents contained in the frame may be played at an improper time. Alternatively, the wraparound may be referred to as round-up. For example, the wraparound manner may be referred to as round-up manner, and the wraparound count may be referred to as round-up count.

In the following description, reproduction techniques of contents for preventing such the playback time errors in the vehicle network will be described. Hereinafter, even when a method (e.g., transmission or reception of a frame) to be performed at the first communication node is described, the corresponding second communication node may perform a method corresponding to the method performed at the first communication node (e.g., reception or transmission of a frame). That is, when an operation of the first communication node is described, the corresponding second communication node may perform an operation corresponding to the operation of the first communication node. Conversely, when an operation of the second communication node is described, the corresponding first communication node may perform an operation corresponding to the operation of the second communication node.

Figure 4:
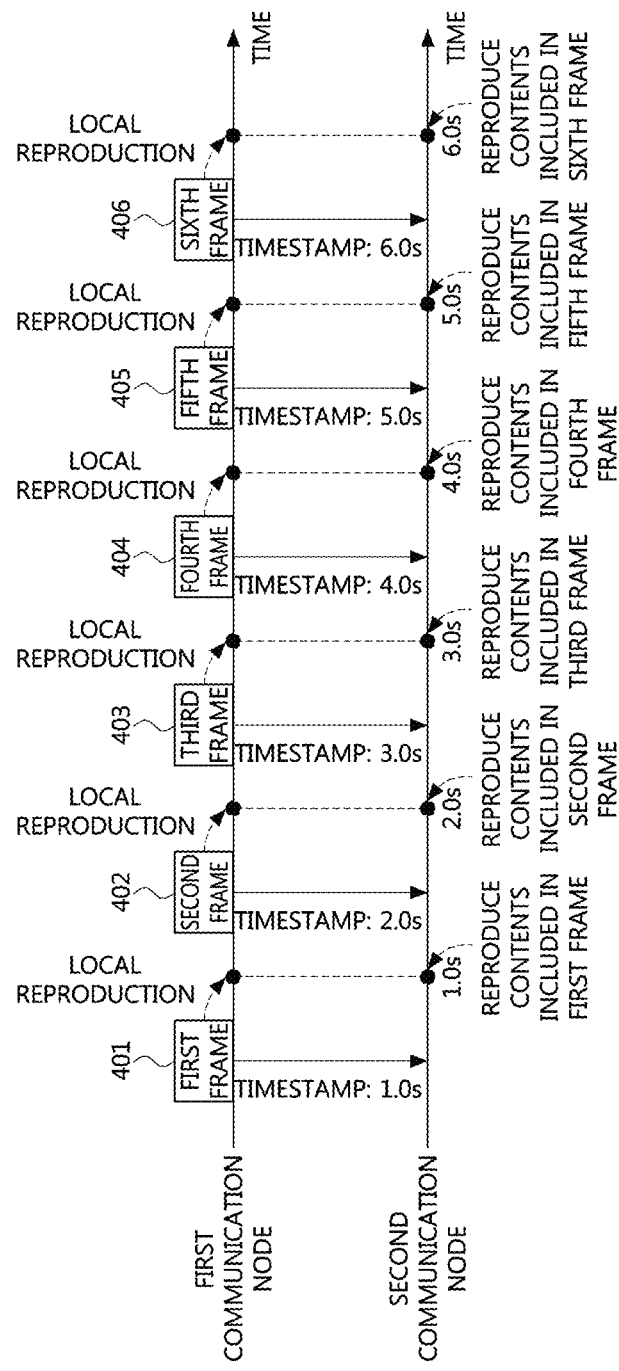
FIG. 4 is a timing diagram illustrating a first embodiment of a communication method in a vehicle network.

FIG. 4 is a timing diagram illustrating a first embodiment of a communication method in a vehicle network.

Referring to FIG. 4, a vehicle network may support an Ethernet protocol and may include a plurality of communication nodes (e.g., at least one gateway, switches, bridges, end nodes). The first communication node may be the first end node 111 shown in FIG. 1, and the second communication node may be the second end node 112 shown in FIG. 1. The first communication node may be referred to as a 'transmitting communication node' that transmits frames containing contents, and the second communication node may be referred to as a 'receiving communication node' that receives the frames from the first communication node. The frames may be generated based on the IEEE 1722 standard.

Each of the first communication node and the second communication node may be configured to be the same as or similar to the communication node 200 shown in FIG. 2. Also, each of the first communication node and the second communication node may be configured to be the same as or similar to the communication node 300 shown in FIG. 3.

The first communication node may generate a first frame 401 containing contents (e.g., audio, video, etc.). The first frame 401 generated by the first communication node may be configured as follows.

Figure 5:
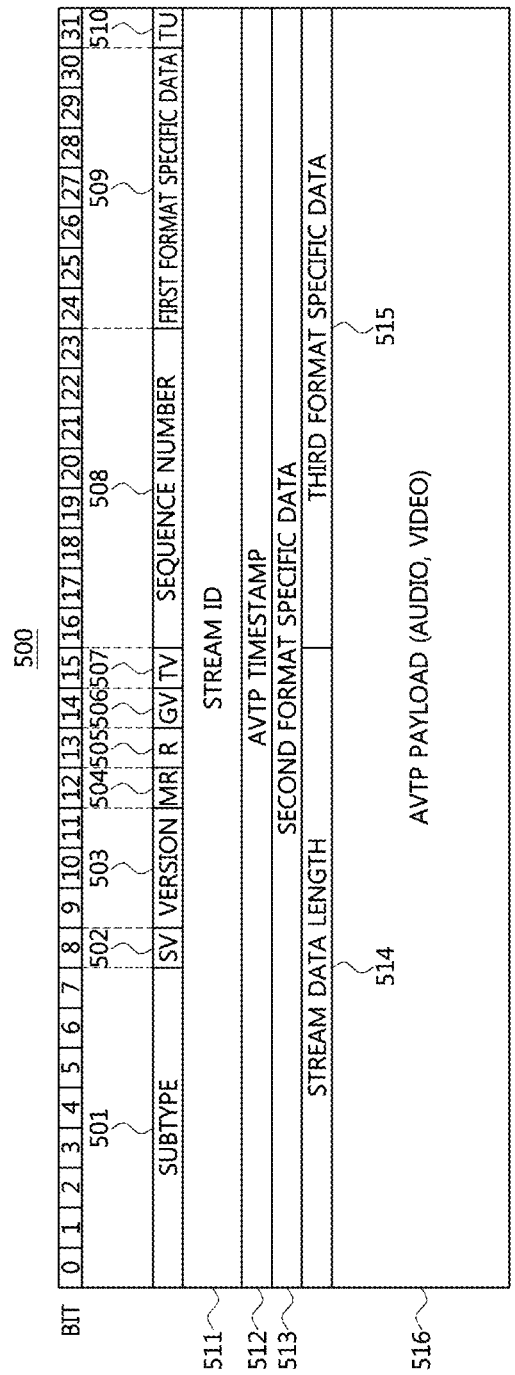
FIG. 5 is a block diagram illustrating a frame format in a vehicle network.

FIG. 5 is a block diagram illustrating a frame format in a vehicle network.

Referring to FIG. 5, a frame 500 may include a header and an AVTP payload field 516. The header may include subtype data fields, a stream (identifier) ID field 511, an AVTP timestamp field 512, format specific fields, and a packet information field. The subtype data fields may include a subtype field 501, a stream identifier valid (SV) field 502, a version field 503, a media clock restart (MR) field 504, a reserved (R) field 505, a gateway information field valid (GV) field 506, an AVTP timestamp valid (TV) field 507, a sequence number field 508, a first format specific data field 509, and a timestamp uncertainty (TU) field 510.

The size of the TV field 507 may be 1 bit and the TV field 507 may indicate a unit of presentation time set by the AVTP timestamp field 512. For example, the TV field 507 set to '1' may indicate that the presentation time is represented in units of nanoseconds, and the TV field 507 set to '0' may indicate that the AVTP timestamp field 512 is not defined. The size of the first format specific data field 509 may be 7 bits, and the first format specific data field 509 may be used as a reserved field. The size of the AVTP timestamp field 512 may be 32 bits and the AVTP timestamp field 512 may indicate the presentation time of the contents (e.g., audio, video, etc.) contained in the AVTP payload field 516. In the case that the TV field 507 is set to '1', the presentation time indicated by the AVTP payload field 516 may be a specific time from 0 s to 4.3 second (s).

The format specific fields may further include a second format specific data field 513. The packet information field may include a stream data length field 514 and a third format specific data field 515. The stream data length field 514 may indicate the size (e.g., octets) of the AVTP payload field 516. The AVTP payload field 516 may include contents (e.g., audio, video, etc.).

Referring again to FIG. 4, in case that the intended playback time of the contents included in the AVTP payload field 516 of the first frame 401 is set to 1.0 s, the TV field 507 of the first frame 401 generated by the first communication node may be set to '1', and the AVTP timestamp field 512 may be set to indicate 1.0 s. The first communication node may transmit the first frame 401. The second communication node may receive the first frame 401 from the first communication node and may identify the information contained in the first frame 401. For example, based on the TV field 507 and the AVTP timestamp field 512 of the first frame 401, the second communication node may confirm that the playback time of the content included in the AVTP payload field 516 of the first frame 401 is 1.0 s. Accordingly, the second communication node may reproduce the contents included in the AVTP payload field 516 of the first frame at 1.0 s.

Also, the first communication node may generate a second frame 402 containing the contents. The second frame 402 may be configured to be the same as or similar to the frame 500 shown in FIG. 5. In case that the intended playback time of the contents included in the AVTP payload field 516 of the second frame 402 is 2.0 s, the TV field 507 of the second frame 402 generated by the first communication node is set to '1', and the AVTP timestamp field 512 may be set to indicate 2.0 s. The first communication node may transmit the second frame 402. The second communication node may receive the second frame 402 from the first communication node and may identify the information contained in the second frame 402. For example, based on the TV field 507 and the AVTP timestamp field 512 of the second frame 402, the second communication node may confirm that the playback time of the contents included in the AVTP payload field 516 of the second frame 402 is 2.0 s. Accordingly, the second communication node may reproduce the content included in the AVTP payload field 516 of the second frame 402 at 2.0 s.

Also, the first communication node may generate a third frame 403 containing the contents. The third frame 403 may be configured to be the same as or similar to the frame 500 shown in FIG. 5. In case that the intended playback time of the content included in the AVTP payload field 516 of the third frame 403 is 3.0 s, the TV field 507 of the third frame 403 generated by the first communication node is set to '1', and the AVTP timestamp field 512 may be set to indicate 3.0 s. The first communication node may transmit the third frame 403. The second communication node may receive the third frame 403 from the first communication node and may identify the information contained in the third frame 403. For example, based on the TV field 507 and the AVTP timestamp field 512 of the third frame 403, the second communication node may confirm that the playback time of the contents included in the AVTP payload field 516 of the third frame 403 is 3.0 s. Accordingly, the second communication node may reproduce the content included in the AVTP payload field 516 of the third frame 403 at 3.0 s.

Also, the first communication node may generate a fourth frame 404 containing the content. The fourth frame 404 may be configured to be the same as or similar to the frame 500 shown in FIG. 5. In case that the intended playback time of the content included in the AVTP payload field 516 of the fourth frame 404 is 4.0 s, the TV field 507 of the fourth frame 404 generated by the first communication node is set to '1', and the AVTP timestamp field 512 may be set to indicate 4.0 s. The first communication node may transmit the fourth frame 404. The second communication node may receive the fourth frame 404 from the first communication node and may identify the information contained in the fourth frame 404. For example, based on the TV field 507 and the AVTP timestamp field 512 of the fourth frame 404, the second communication node may confirm that the playback time of the content included in the AVTP payload field 516 of the fourth frame 404 is 4.0 s. Accordingly, the second communication node may reproduce the content included in the AVTP payload field 516 of the fourth frame 404 at 4.0 s.

Also, the first communication node may generate a fifth frame 405 containing the contents. The fifth frame 405 may be configured to be the same as or similar to the frame 500 shown in FIG. 5. In case that the intended playback time of the content included in the AVTP payload field 516 of the fifth frame 405 is 5.0 s, since the maximum value that can be indicated by the AVTP timestamp field 512 is 4.3 s, the first communication node may set the AVTP timestamp field to indicate 0.7 s (i.e., 0.7 s=5.0 s−4.3 s) according to the wraparound method. Here, the TV field of the fifth frame 405 may be set to '1'.

The second communication node may receive the fifth frame 405 from the first communication node and may identify the information contained in the fifth frame 405. For example, the second communication node may confirm that the presentation time indicated by the AVTP timestamp field 512 is represented in units of nanoseconds based on the TV field 507 of the fifth frame 405. Also, since the presentation time (i.e., 0.7 s) indicated by the AVTP timestamp field 512 of the fifth frame 405 is smaller than the presentation time (i.e., 4.0 s) indicated by the AVTP timestamp field 512 of the previous frame (i.e., the fourth frame 404), the second communication node may determine that the wraparound count for the fifth frame 405 is increased. In this case, based on the TV field 507 and the AVTP timestamp field 512 of the fifth frame 405, the second communication node may determine that the playback time of the contents included in the AVTP payload field 615 of the fifth frame 405 is 5.0 s (i.e., 4.3 s+0.7 s). Accordingly, the second communication node may reproduce the contents included in the AVTP payload field 516 of the fifth frame 405 at 5.0 s.

Also, the first communication node may generate a sixth frame 406 containing the content. The sixth frame 406 may be configured to be the same as or similar to the frame 500 shown in FIG. 5. In case that the intended playback time of the contents included in the AVTP payload field 516 of the sixth frame 406 is 6.0 s, the TV field 507 of the sixth frame 406 generated by the first communication node is set to '1', and the AVTP timestamp field 512 may be set to indicate 1.7 s. The first communication node may transmit the sixth frame 406. The second communication node may receive the sixth frame 406 from the first communication node and may identify the information contained in the sixth frame 406. For example, based on the TV field 507 and the AVTP timestamp field 512 of the sixth frame 406, the second communication node may confirm that the playback time of the contents included in the AVTP payload field 516 of the sixth frame 406 is 6.0 s. Accordingly, the second communication node may reproduce the contents included in the AVTP payload field 516 of the sixth frame 406 at 6.0 s.

Figure 6:
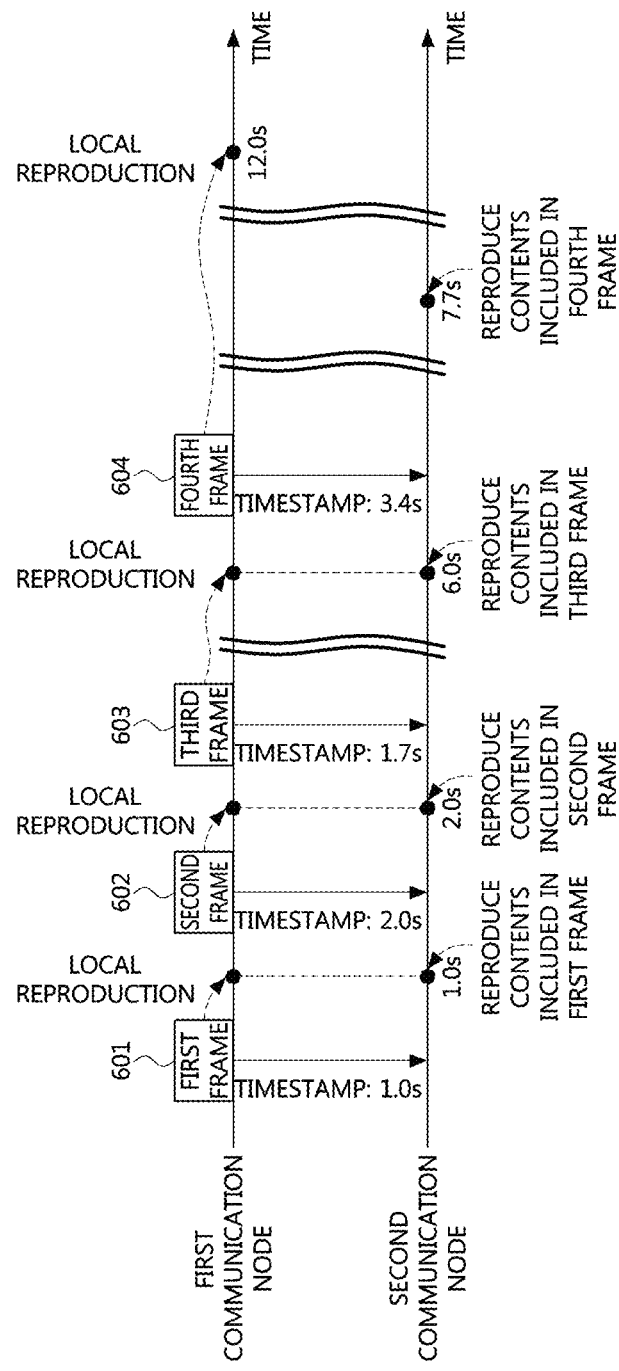
FIG. 6 is a timing diagram illustrating a second embodiment of a communication method in a vehicle network.

FIG. 6 is a timing diagram illustrating a second embodiment of a communication method in a vehicle network.

Referring to FIG. 6, a vehicle network may support an Ethernet protocol and may include a plurality of communication nodes (e.g., at least one gateway, switches, bridges, end nodes). The first communication node may be the first end node 111 shown in FIG. 1, and the second communication node may be the second end node 112 shown in FIG. 1. The first communication node may be referred to as a 'transmitting communication node' that transmits frames containing contents, and the second communication node may be referred to as a 'receiving communication node' that receives the frames from the first communication node. The frames may be generated based on the IEEE 1722 standard. Each of the first communication node and the second communication node may be configured to be the same as or similar to the communication node 200 shown in FIG. 2. Also, each of the first communication node and the second communication node may be configured to be the same as or similar to the communication node 300 shown in FIG. 3.

Also, the first communication node may generate a first frame 601 containing contents. The first frame 601 may be configured to be the same as or similar to the frame 500 shown in FIG. 5. In case that the intended playback time of the contents included in the AVTP payload field 516 of the first frame 601 is 1.0 s, the TV field 507 of the first frame 601 generated by the first communication node may be set to '1', and the AVTP timestamp field 512 may be set to indicate 1.0 s. The first communication node may transmit the first frame 601. The second communication node may receive the first frame 601 from the first communication node and may identify the information contained in the first frame 601. For example, based on the TV field 507 and the AVTP timestamp field 512 of the first frame 601, the second communication node may confirm that the playback time of the contents included in the AVTP payload field 516 of the first frame 601 is 1.0 s. Accordingly, the second communication node may reproduce the contents included in the AVTP payload field 516 of the first frame 601 at 1.0 s.

Also, the first communication node may generate a second frame 602 containing contents. The second frame 602 may be configured to be the same as or similar to the frame 500 shown in FIG. 5. In case that the intended playback time of the contents included in the AVTP payload field 516 of the second frame 602 is 2.0 s, the TV field 507 of the second frame 602 generated by the first communication node may be set to '1', and the AVTP timestamp field 512 may be set to indicate 2.0 s. The first communication node may transmit the second frame 602. The second communication node may receive the second frame 602 from the first communication node and may identify the information contained in the second frame 602. For example, based on the TV field 507 and the AVTP timestamp field 512 of the second frame 602, the second communication node may confirm that the playback time of the contents included in the AVTP payload field 516 of the second frame 602 is 2.0 s. Accordingly, the second communication node may reproduce the contents included in the AVTP payload field 516 of the second frame 602 at 2.0 s.

Also, the first communication node may generate a third frame 603 containing the contents. The third frame 603 may be configured to be the same as or similar to the frame 500 shown in FIG. 5. Since the intended playback time of the contents included in the AVTP payload field 516 of the third frame 603 is 6.0 s, and the maximum value that can be indicated by the AVTP timestamp field 512 is 4.3 s, the first communication node may set the AVTP timestamp field to indicate 1.7 s (i.e., 1.7 s=6.0 s−4.3 s) according to the wraparound method. Here, the TV field of the third frame 603 may be set to '1'. Then, the first communication node may transmit the third frame 603.

The second communication node may receive the third frame 603 from the first communication node and may identify the information contained in the third frame 603. For example, the second communication node may confirm that the presentation time indicated by the AVTP timestamp field 512 is represented in units of nanoseconds based on the TV field 507 of the third frame 603. Also, since the presentation time (i.e., 1.7 s) indicated by the AVTP timestamp field 512 of the third frame 603 is smaller than the presentation time (i.e., 2.0 s) indicated by the AVTP timestamp field 512 of the previous frame (i.e., the second frame 602), the second communication node may determine that the wraparound count for the third frame 603 is increased. In this case, based on the TV field 507 and the AVTP timestamp field 512 of the third frame 603, the second communication node may determine that the playback time of the content included in the AVTP payload field 615 of the third frame 603 is 6.0 s (i.e., 4.3 s+1.7 s). Accordingly, the second communication node may reproduce the contents included in the AVTP payload field 516 of the third frame 603 at 6.0 s.

Also, the first communication node may generate a fourth frame 604 containing the contents. The fourth frame 604 may be configured to be the same as or similar to the frame 500 shown in FIG. 5. Since the intended playback time of the contents included in the AVTP payload field 516 of the fourth frame 604 is 12.0 s, and the maximum value that can be indicated by the AVTP timestamp field 512 is 4.3 s, the first communication node may set the AVTP timestamp field 512 to indicate 3.4 s (i.e., 3.4 s=12.0 s–4.3 s–4.3 s) according to the wraparound method. Here, the TV field of the fourth frame 604 may be set to '1'. Then, the first communication node may transmit the fourth frame 604.

The second communication node may receive the fourth frame 604 from the first communication node and may identify the information contained in the fourth frame 604. For example, the second communication node may confirm that the presentation time indicated by the AVTP timestamp field 512 is represented in units of nanoseconds based on the TV field 507 of the fourth frame 604. Also, since the presentation time (i.e., 3.4 s) indicated by the AVTP timestamp field 512 of the fourth frame 604 is larger than the presentation time (i.e., 1.7 s) indicated by the AVTP timestamp field 512 of the previous frame (i.e., the third frame 603), the second communication node may determine that the wraparound count for the fourth frame 604 is identical to the wraparound count for the third frame 603. In this case, based on the TV field 507 and the AVTP timestamp field 512 of the fourth frame 604, the second communication node may determine that the playback time of the content included in the AVTP payload field 615 of the fourth frame 604 is 7.7 s (i.e., 4.3 s+3.4 s) not 12.0 s intended by the first communication node. Accordingly, the second communication node may reproduce the contents included in the AVTP payload field 516 of the fourth frame 604 at 7.7 s.

In this case, the time at which the content included in the fourth frame 604 is reproduced at the second communication node (i.e., 7.7 s) may be different from the presentation time (i.e., 12.0 s) of the content included in the fourth frame 604 set by the first communication node.

That is, the playback times of the contents included in the fourth frame 604 at the first communication node and the second communication node may differ due to the recognition error of the wraparound count of the fourth frame 604. In order to solve the recognition error problem of the wraparound count, communications between the communication nodes in the vehicle network may be performed as follows.

Figure 7:
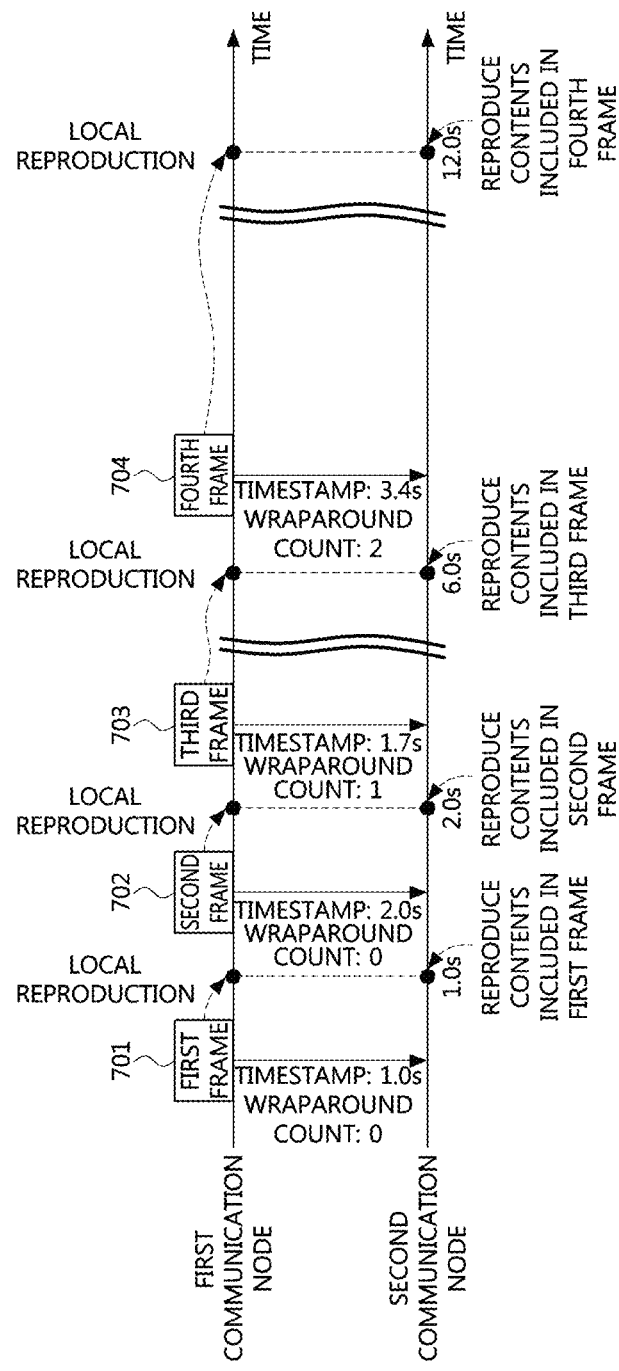
FIG. 7 is a timing diagram illustrating a third embodiment of a communication method in a vehicle network.

FIG. 7 is a timing diagram illustrating a third embodiment of a communication method in a vehicle network.

Referring to FIG. 7, a vehicle network may support an Ethernet protocol and may include a plurality of communication nodes (e.g., at least one gateway, switches, bridges, end nodes). The first communication node may be the first end node 111 shown in FIG. 1, and the second communication node may be the second end node 112 shown in FIG. 1. The first communication node may be referred to as a 'transmitting communication node' that transmits frames containing contents, and the second communication node may be referred to as a 'receiving communication node' that receives the frames from the first communication node. The frames may be generated based on the protocol defined in the IEEE 1722 standard. Each of the first communication node and the second communication node may be configured to be the same as or similar to the communication node 200 shown in FIG. 2. Also, each of the first communication node and the second communication node may be configured to be the same as or similar to the communication node 300 shown in FIG. 3.

Here, each of 701, 702, 703, and 704 may be configured to be the same as or similar to the frame 500 shown in FIG. 5. However, the first format specific data field 509 (e.g., a reserved field) of each of the frames 701, 702, 703, and 704 may indicate a wraparound count of each of the frames 701, 702, 703, and 704. In this case, the first format specific data field 509 of each of the frames 701, 702, 703 and 704 may be referred to as a 'count field', and the time at which the contents included in each of the frames 701, 702, 703, 704 is to be reproduced may be calculated based on Equation 1 below.

$$T_A = (T_{max} \times C) + T_P \qquad \text{[Equation 1]}$$

$T_A$ may indicate the time at which the content is to be reproduced (i.e., playback time), and $T_{max}$ may indicate the maximum value that can be represented by the AVTP timestamp field 512. In case that the presentation time indicated by the AVTP timestamp field 512 is represented in units of nanoseconds, $T_{max}$ may be 4.3 s. C may be a value indicated by the count field, and may be an integer greater than or equal to zero. $T_P$ may be the presentation time time indicated by the AVTP timestamp field 512.

The first communication node may generate a first frame 701 containing contents. For example, the first communication node may identify a playback time of the content to be included in the first frame 701. In case that it is determined that the playback time of the contents to be included in the first frame 701 is 1.0 s, the first communication node may determine the unit of representation time of the contents. In case that the presentation time of the contents is determined to be represented in units of nanoseconds, the first communication node may set a TV field 507 of the first frame 701 to '1'. The first communication node may set a count field of the first frame 701 to indicate '0' since a wraparound count for the presentation time of the contents to be included in the first frame 701 is '0'. Based on the TV field 507 and the count field, the first communication node may set an AVTP timestamp field 512 of the first frame 701 to indicate 1.0 s. The first communication node may generate a header that includes the TV field 507, the count field, the AVTP timestamp field 512, etc., and may generate the first frame 701 including the header and an AVTP payload field 516, and then transmit the first frame 701.

The second communication node may receive the first frame 701 from the first communication node, and may identify the information contained in first frame 701. For example, based on the TV field 507 of the first frame 701, the second communication node may confirm that the presentation time of the contents included in the first frame 701 is represented in units of nanoseconds. Also, based on the count field of the first frame 701, the second communication node may identify the wraparound count (i.e., '0') for the presentation time of the contents included in the first frame 701. Also, based on the TV field 507, the count field, and the AVTP timestamp field 512 of the first frame 701, the second communication node may confirm that the time at which the content is to be reproduced is 1.0 s. For example, the second communication node may confirm that the time at which the content is to be reproduced is 1.0 s based on a calculation result of Equation 1 (i.e., (4.3*0)+1.0). Accordingly, the second communication node may reproduce the contents included in the AVTP payload field 516 of the first frame 701 at 1.0 s.

The first communication node may generate a second frame 702 containing contents. For example, the first communication node may identify a playback time of the contents to be included in the second frame 702. In case that it is determined that the playback time of the contents to be included in the second frame 702 is 2.0 s, the first communication node may determine the unit of representation time of the content. In case that the presentation time of the content is determined to be represented in units of nanoseconds, the first communication node may set a TV field 507 of the second frame 702 to '1'. The first communication node may set a count field of the second frame 702 to indicate '0' since a wraparound count for the presentation time of the content to be included in the second frame 702 is '0'. Based on the TV field 507 and the count field, the first communication node may set an AVTP timestamp field 512 of the second frame 702 to indicate 2.0 s. The first communication node may generate a header that includes the TV field 507, the count field, the AVTP timestamp field 512, etc., and may generate the second frame 702 including the header and an AVTP payload field 516, and then transmit the second frame 702.

The second communication node may receive the second frame 702 from the first communication node, and may identify the information contained in second frame 702. For example, based on the TV field 507 of the second frame 702, the second communication node may confirm that the presentation time of the content included in the second frame 702 is represented in units of nanoseconds. Also, based on the count field of the second frame 702, the second communication node may identify the wraparound count (i.e., '0') for the presentation time of the contents included in the second frame 702. Also, based on the TV field 507, the count field, and the AVTP timestamp field 512 of the second frame 702, the second communication node may confirm that the time at which the content is to be reproduced is 2.0 s. For example, the second communication node may confirm that the time at which the content is to be reproduced is 2.0 s based on a calculation result of Equation 1 (i.e., (4.3*0)+2.0)). Accordingly, the second communication node may reproduce the content included in the AVTP payload field 516 of the second frame 702 at 2.0 s.

The first communication node may generate a third frame 703 containing contents. For example, the first communication node may identify a playback time of the content to be included in the third frame 703. In case that it is determined that the playback time of the content to be included in the third frame 702 is 6.0 s, the first communication node may determine the unit of representation time of the content. In case that the presentation time of the content is determined to be represented in units of nanoseconds, the first communication node may set a TV field 507 of the third frame 702 to '1'. Since the maximum value that can be indicated by the AVTP timestamp field 512 is 4.3 s and the playback time of the content included in the AVTP payload field 516 of the third frame 703 is 6.0 s, the first communication node may determine that the wraparound count for the presentation time of the contents to be included in the third frame 703 is '1' (i.e., from (6=(4.3*1)+1.7)). Therefore, based on the TV field 507 and the count field, the first communication node may set the AVTP timestamp field 512 of the third frame 703 to indicate 1.7 s. The first communication node may generate a header that includes the TV field 507, the count field, the AVTP timestamp field 512, etc., generate the third frame 703 including the header and an AVTP payload field 516, and may then transmit the third frame 703.

The second communication node may receive the third frame 703 from the first communication node, and may identify the information included in the third frame 703. For example, the second communication node may confirm the unit of representation time (i.e., nanosecond) of the contents included in the third frame 703 based on the TV field 507 of the third frame 703, and the wraparound count (i.e., '1') of the contents included in the third frame 703 with respect to the presentation time based on the count field of the third frame 703. Also, based on the TV field 507, the count field, and the AVTP timestamp field 512 of the third frame 703, the second communication node may confirm that the time at which the content is to be reproduced is 6.0 s (i.e., (4.3*1)+1.7). For example, the second communication node may confirm that the time at which the content is to be reproduced is 6.0 s based on a calculation result of Equation 1 (i.e., (4.3*1)+1.7). Accordingly, the second communication node may reproduce the contents included in the AVTP payload field 516 of the third frame 703 at 6.0 s.

The first communication node may generate a fourth frame 704 containing contents. For example, the first communication node may identify a playback time of the content to be included in the fourth frame 704. In case that it is determined that the playback time of the content to be included in the fourth frame 704 is 12.0 s, the first communication node may determine the unit of representation time of the content. In case that the presentation time of the content is determined to be represented in units of nanoseconds, the first communication node may set a TV field 507 of the fourth frame 704 to '1'. Since the maximum value that can be indicated by the AVTP timestamp field 512 is 4.3 s and the presentation time of the content included in the AVTP payload field 516 of the fourth frame 704 is 12.0 s, the first communication node may determine that the wraparound count for the presentation time of the content to be included in the fourth frame 704 is '2' (i.e., from (12=(4.3*2)+3.4)). Therefore, based on the TV field 507 and the count field, the first communication node may set the AVTP timestamp field 512 of the fourth frame 704 to indicate 3.4 s. The first communication node may generate a header that includes the TV field 507, the count field, the AVTP timestamp field 512, etc., generate the fourth frame 704 including the header and an AVTP payload field 516, and may then transmit the fourth frame 704.

The second communication node may receive the fourth frame 704 from the first communication node, and may identify the information included in the fourth frame 703. For example, the second communication node may confirm the unit of representation time (i.e., nanosecond) of the contents included in the fourth frame 704 based on the TV field 507 of the fourth frame 704, and the wraparound count (i.e., '2') of the contents included in the fourth frame 704 with respect to the presentation time based on the count field of the fourth frame 704. Also, based on the TV field 507, the count field, and the AVTP timestamp field 512 of the fourth frame 704, the second communication node may confirm that the time at which the content is to be reproduced is 12.0 s (i.e., (4.3*2)+3.4). For example, the second communication node may confirm that the time at which the content is to be reproduced is 12.0 s based on a calculation result of Equation 1 (i.e., (4.3*2+1.7). Accordingly, the second communication node may reproduce the content included in the AVTP payload field 516 of the fourth frame 704 at 12.0 s.

FIG. 8 is a timing diagram illustrating a fourth embodiment of a communication method in a vehicle network.

Referring to FIG. 8, a vehicle network may support an Ethernet protocol and may include a plurality of communication nodes (e.g., at least one gateway, switches, bridges, end nodes). The first communication node may be the first end node 111 shown in FIG. 1, and the second communication node may be the second end node 112 shown in FIG. 1. The first communication node may be referred to as a 'transmitting communication node' that transmits frames containing contents, and the second communication node may be referred to as a 'receiving communication node' that receives the frames from the first communication node. The frames may be generated based on the protocol defined in the IEEE 1722 standard. Each of the first communication node and the second communication node may be configured to be the same as or similar to the communication node 200 shown in FIG. 2. Also, each of the first communication node and the second communication node may be configured to be the same as or similar to the communication node 300 shown in FIG. 3.

Here, each of 701, 702, 703, and 704 may be configured to be the same as or similar to the frame 500 shown in FIG. 5. However, 2 bits of the first format specific data field 509 (e.g., a reserved field) of each of the frames 701, 702, 703, and 704 may indicate the unit of the presentation time. In this case, the 2 bits of the first format specific data field 509 may be referred to as a 'unit field', and the unit field may be configured as following Table 1.

TABLE 1

| Value | Description |
|---|---|
| 00 | Nanosecond (ns) |
| 01 | Microsecond (μs) |
| 10 | Millisecond (ms) |
| 11 | Second (s) |

For example, in case that the unit field is set to '00', the presentation time indicated by the AVTP timestamp field 512 of each of the frames 701, 702, 703, and 704 may a specific time from 0 to 4.3 s. In case that the unit field is set to '01', the presentation time indicated by the AVTP timestamp field 512 of each of the frames 701, 702, 703, and 704 may be a specific time from 0 to 4300 s. In case that the unit field is set to '10', the presentation time indicated by the AVTP timestamp field 512 of each of the frames 701, 702, 703, and 704 may be a specific time from 0 to 4300000 s. In case that the unit field is set to '11', the presentation time indicated by the AVTP timestamp field 512 of each of the frames 701, 702, 703, and 704 may be a specific time from 0 to 4300000000 s.

In case that the unit field is used, the TV field 507 in each of the frames 701, 702, 703, and 704 may not be used. Also, the remaining 5 bits of the first format specific data field 509 of each of the frames 701, 702, 703, and 704 may be used to indicate a wraparound count. The 5 bits of the first format specific data field 509 used to indicate the wraparound count may be referred to as a 'count field'. The playback time of the contents included in each of the frames 701, 702, 703, and 704 may be calculated based on Equation 1. In the case that the unit field is set to '00', $T_{max}$ in Equation 1 may be 4.3 s. In the case that the unit field is set to '01', $T_{max}$ in Equation 1 may be 4300 s. In the case that the unit field is set to '10', $T_{max}$ in Equation 1 may be 4300000 s. In the case that the unit field is set to '11', $T_{max}$ in Equation 1 may be 4300000000 s.

The first communication node may generate a first frame 801 containing contents. For example, the first communication node may identify a playback time of the content to be included in the first frame 801. In case that it is determined that the playback time of the content to be included in the first frame 801 is 1.0 s, the first communication node may determine the unit of representation time of the content. In case that the presentation time of the contents is determined to be represented in units of microseconds, the first communication node may set a unit field of the first frame 801 to '01'. Based on the unit field of the first frame 801, the first communication node may set the AVTP timestamp field 512 of the first frame 801 to indicate 1.0 s. Alternatively, when the count field is used in addition to the unit field, the first communication node may set the count field of the first frame 801 to indicate '0', and set the AVTP timestamp field 512 to indicate 1.0 s based on the unit field and the count field. The first communication node may generate a header that includes the unit field 507 and the AVTP timestamp field 512 (or, a header the includes the unit field, the count field, and the AVTP timestamp field 512), generate the first frame 801 including the header and an AVTP payload field 516, and may then transmit the first frame 801.

The second communication node may receive the first frame 801 from the first communication node, and may identify the information contained in the first frame 801. For example, based on the unit field of the first frame 801, the second communication node may identify the unit (e.g., μs) of the presentation time of the contents included in the first frame 801. Also, in case that the count field exists in the first frame 801, the second communication node may identify the wraparound count (e.g., '0') for the presentation time of the contents included in the first frame 801 based on the count field of the first frame 801. Based on the unit field and the AVTP timestamp field 512 (or, the unit field, the count field, and the AVTP timestamp field 512), the second communication node may confirm that the time at which the content is to be reproduced is 1.0 s. For example, the second communication node may confirm that the time at which the content is to be reproduced is 1.0 s based on a calculation result of Equation 1 (i.e., (4.3*0)+1.0). Accordingly, the second communication node may reproduce the contents included in the AVTP payload field 516 of the first frame 801 at 1.0 s.

The first communication node may generate a second frame 802 containing contents. For example, the first communication node may identify a playback time of the content to be included in the second frame 802. In case that it is determined that the playback time of the content to be included in the second frame 801 is 2.0 s, the first communication node may determine the unit of representation time of the contents. In case that the presentation time of the contents is determined to be represented in units of microseconds, the first communication node may set a unit field of the second frame 802 to '01'. Based on the unit field of the second frame 802, the first communication node may set the AVTP timestamp field 512 of the second frame 802 to indicate 2.0 s. Alternatively, when the count field is used in addition to the unit field, the first communication node may set the count field of the second frame 802 to indicate '0', and set the AVTP timestamp field 512 to indicate 2.0 s based on the unit field and the count field. The first communication node may generate a header that includes the unit field and the AVTP timestamp field 512 (or, a header the includes the unit field, the count field, and the AVTP timestamp field 512), generate the second frame 802 including the header and an AVTP payload field 516, and may then transmit the second frame 802.

The second communication node may receive the second frame 802 from the first communication node, and may identify the information contained in the second frame 802. For example, based on the unit field of the second frame 802, the second communication node may identify the unit (e.g., μs) of the presentation time of the content included in the second frame 802. Also, in case that the count field exists in the second frame 802, the second communication node may identify the wraparound count (e.g., '0') for the presentation time of the contents included in the second frame 802 based on the count field of the second frame 802. Based on the unit field and the AVTP timestamp field 512 (or, the unit field, the count field, and the AVTP timestamp field 512), the second communication node may confirm that the time at which the content is to be reproduced is 2.0 s. For example, the second communication node may confirm that the time at which the content to be is reproduced is 2.0 s based on a calculation result of Equation 1 (i.e., (4.3*0)+2.0). Accordingly, the second communication node may reproduce the contents included in the AVTP payload field 516 of the second frame 802 at 2.0 s.

The first communication node may generate a third frame 803 containing contents. For example, the first communication node may identify a playback time of the content to be included in the third frame 803. In case that it is determined that the playback time of the content to be included in the third frame 803 is 22.0 s, the first communication node may determine the unit of representation time of the contents. In case that the presentation time of the content is determined to be represented in units of microseconds, the first communication node may set a unit field of the third frame 803 to '01'. Based on the unit field of the third frame 803, the first communication node may set the AVTP timestamp field 512 of the third frame 803 to indicate 22.0 s. Alternatively, when the count field is used in addition to the unit field, the first communication node may set the count field of the third frame 803 to indicate '0', and set the AVTP timestamp field 512 to indicate 22.0 s based on the unit field and the count field. The first communication node may generate a header that includes the unit field and the AVTP timestamp field 512 (or, a header the includes the unit field, the count field, and the AVTP timestamp field 512), generate the third frame 803 including the header and an AVTP payload field 516, and may then transmit the third frame 803.

The second communication node may receive the third frame 803 from the first communication node, and may identify the information contained in the third frame 803. For example, based on the unit field of the third frame 803, the second communication node may identify the unit (e.g., μs) of the presentation time of the content included in the third frame 803. Also, in case that the count field exists in the third frame 803, the second communication node may identify the wraparound count (e.g., '0') for the presentation time of the content included in the third frame 803 based on the count field of the third frame 803. Based on the unit field and the AVTP timestamp field 512 (or, the unit field, the count field, and the AVTP timestamp field 512), the second communication node may confirm that the time at which the content is to be reproduced is 22.0 s. For example, the second communication node may confirm that the time at which the content is to be reproduced is 22.0 s based on a calculation result of Equation 1 (i.e., (4300*0)+22.0). Accordingly, the second communication node may reproduce the content included in the AVTP payload field 516 of the third frame 803 at 22.0 s.

The first communication node may generate a fourth frame 804 containing content. For example, the first communication node may identify a playback time of the content to be included in the fourth frame 804. In case that it is determined that the playback time of the content to be included in the fourth frame 804 is 137.0 s, the first communication node may determine the unit of representation time of the content. In case that the presentation time of the content is determined to be represented in units of microseconds, the first communication node may set a unit field of the fourth frame 804 to '01'. Based on the unit field of the fourth frame 804, the first communication node may set the AVTP timestamp field 512 of the fourth frame 804 to indicate 137.0 s. Alternatively, when the count field is used in addition to the unit field, the first communication node may set the count field of the fourth frame 804 to indicate '0', and set the AVTP timestamp field 512 to indicate 137.0 s based on the unit field and the count field. The first communication node may generate a header that includes the unit field and the AVTP timestamp field 512 (or, a header the includes the unit field, the count field, and the AVTP timestamp field 512), generate the fourth frame 804 including the header and an AVTP payload field 516, and may then transmit the fourth frame 804.

The second communication node may receive the fourth frame 804 from the first communication node, and may identify the information contained in the fourth frame 804. For example, based on the unit field of the fourth frame 804, the second communication node may identify the unit (e.g., μs) of the presentation time of the content included in the fourth frame 804. Also, in case that the count field exists in the fourth frame 804, the second communication node may identify the wraparound count (e.g., '0') for the presentation time of the content included in the fourth frame 804 based on the count field of the fourth frame 804. Based on the unit field and the AVTP timestamp field 512 (or, the unit field, the count field, and the AVTP timestamp field 512), the second communication node may confirm that the time at which the content is to be reproduced is 137.0 s. For example, the second communication node may confirm that the time at which the content is to be reproduced is 137.0 s based on a calculation result of Equation 1 (i.e., (4300*0)+137.0). Accordingly, the second communication node may reproduce the content included in the AVTP payload field 516 of the fourth frame 804 at 137.0 s.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure.

What is claimed is:

1. An operation method of a first communication node in a vehicle network, the operation method comprising:
   setting, by a processor of the first communication node, a count field to indicate a wraparound count;
   setting, by the processor, a timestamp field to indicate a presentation time of contents;
   generating, by the processor, a header including the count field and the timestamp field;
   generating, by the processor, a payload field including the contents; and
   transmitting, by the processor, a frame including the header and the payload field to a second communication node belonging to the vehicle network,
   wherein the wraparound count indicates a count of times that a playback time of the contents wraps around a maximum value of timestamp indicated by the timestamp field,
   wherein the contents are reproduced at a time which is obtained based on the maximum value of the timestamp indicated by the timestamp field, the wraparound count indicated by the count field, and the presentation time indicated by the timestamp field.

2. The operation method according to claim 1, wherein the header further includes a unit field indicating a unit of the presentation time, and the unit field is set to indicate nanosecond, microsecond, millisecond, or second.

3. The operation method according to claim 2, wherein the timestamp field indicates a specific time from 0 to 4.3 seconds when the unit field indicates nanosecond, the timestamp field indicates a specific time from 0 to 4300 seconds when the unit field indicates microsecond, the timestamp field indicates a specific time from 0 to 4300000 seconds when the unit field indicates millisecond, and the timestamp field indicates a specific time from 0 to 4300000000 seconds when the unit field indicates second.

4. The operation method according to claim 2, wherein the frame is generated based on an Institute of Electrical and Electronics Engineers (IEEE) 1722 protocol, 2 bits of a reserved field included in the header of the frame are used for the unit field, and the remaining bits of the reserved field, except for the 2 bits used for the unit field, are used for the count field.

5. The operation method according to claim 1, wherein the contents are reproduced at $T_A$ obtained by TA=(Tmax×C)+TP, wherein $T_{max}$ is the maximum value of timestamp indicated by the timestamp field, C is the wraparound count indicated by the count field, and $T_P$ is the presentation time indicated by the timestamp field.

6. The operation method according to claim 1, wherein the vehicle network comprises a plurality of end nodes, a plurality of switches, and at least one gateway, wherein the first communication node is a first end node among the plurality of end nodes, and the second communication node is a second end node among the plurality of end nodes.

7. An operation method of a first communication node in a vehicle network, the operation method comprising:
   receiving, by a processor of the first communication node, a frame including a header and a payload field from a second communication node belonging to the vehicle network;
   identifying, by the processor, a unit of a presentation time of contents included in the payload field based on a unit field included in the header;
   identifying, by the processor, a wraparound count based on a count field included in the header;
   identifying, by the processor, the presentation time of contents based on a timestamp field included in the header; and
   reproducing, by the processor, the contents at a playback time indicated by the unit of the presentation time, the wraparound count, and the presentation time,
   wherein the wraparound count indicates a count of times that the playback time of the contents wraps around a maximum value of timestamp indicated by the timestamp field,
   wherein the contents are reproduced at a time which is obtained based on the maximum value of the timestamp indicated by the timestamp field, the wraparound count indicated by the count field, and the presentation time indicated by the timestamp field.

8. The operation method according to claim 7, wherein the unit field is set to indicate nanosecond, microsecond, millisecond, or second.

9. The operation method according to claim 8, wherein the timestamp field indicates a specific time from 0 to 4.3 seconds when the unit field indicates nanosecond, the timestamp field indicates a specific time from 0 to 4300 seconds when the unit field indicates microsecond, the timestamp field indicates a specific time from 0 to 4300000 seconds when the unit field indicates millisecond, and the timestamp field indicates a specific time from 0 to 4300000000 seconds when the unit field indicates second.

10. The operation method according to claim 8, wherein the frame is generated based on an Institute of Electrical and Electronics Engineers (IEEE) 1722 protocol, 2 bits of a reserved field included in the header of the frame are used for the unit field, and the remaining bits of the reserved field, except for the 2 bits used for the unit field, are used for the count field.

11. The operation method according to claim 7, wherein the contents are reproduced at $T_A$ obtained by TA=(Tmax×C)+$T_P$, wherein $T_{max}$ is the maximum value of timestamp indicated by the timestamp field, C is the wraparound count indicated by the count field, and $T_P$ is the presentation time indicated by the timestamp field.

12. A first communication node in a vehicle network, comprising a processor and a memory storing at least one instruction executed by the processor, wherein the at least one instruction is configured to:
   set, by a processor of the first communication node, a count field to indicate a wraparound count;
   set, by the processor, a timestamp field to indicate a presentation time of the contents;
   generate, by the processor, a header including the count field and the timestamp field;
   generate, by the processor, a payload field including the contents; and
   transmit, by the processor, a frame including the header and the payload field to a second communication node belonging to the vehicle network,
   wherein the wraparound count indicates a count of times that a playback time of the contents wraps around a maximum value of timestamp indicated by the timestamp field,
   wherein the contents are reproduced at a time which is obtained based on the maximum value of the timestamp indicated by the timestamp field, the wraparound count indicated by the count field, and the presentation time indicated by the timestamp field.

13. The first communication node according to claim 12, wherein the header further includes a unit field indicating a unit of the presentation time, and the unit field is set to indicate nanosecond, microsecond, millisecond, or second.

14. The first communication node according to claim 13, wherein the timestamp field indicates a specific time from 0 to 4.3 seconds when the unit field indicates nanosecond, the timestamp field indicates a specific time from 0 to 4300 seconds when the unit field indicates microsecond, the timestamp field indicates a specific time from 0 to 4300000 seconds when the unit field indicates millisecond, and the timestamp field indicates a specific time from 0 to 4300000000 seconds when the unit field indicates second.

15. The first communication node according to claim 13, wherein the frame is generated based on an Institute of Electrical and Electronics Engineers (IEEE) 1722 protocol, 2 bits of a reserved field included in the header of the frame are used for the unit field, and the remaining bits of the reserved field, except for the 2 bits used for the unit field, are used for the count field.

16. The first communication node according to claim 12, wherein the contents are reproduced at $T_A$ obtained by $TA=(Tmax \times C)+TP$, wherein $T_{max}$ is the maximum value of timestamp indicated by the timestamp field, C is the wrap-around count indicated by the count field, and $T_P$ is the presentation time indicated by the timestamp field.

17. The first communication node according to claim 12, wherein the vehicle network comprises a plurality of end nodes, a plurality of switches, and at least one gateway, wherein the first communication node is a first end node among the plurality of end nodes, and the second communication node is a second end node among the plurality of end nodes.

* * * * *